US010557729B2

(12) United States Patent
Higashimachi et al.

(10) Patent No.: US 10,557,729 B2
(45) Date of Patent: Feb. 11, 2020

(54) SENSOR MOUNTING STRUCTURE

(71) Applicant: TOYOTA JIDOSHA KABUSHIKI KAISHA, Toyota-shi, Aichi-ken (JP)

(72) Inventors: Naoya Higashimachi, Toyota (JP); Hiroaki Ito, Toyota (JP); Koh Mizutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/199,005

(22) Filed: Nov. 23, 2018

(65) Prior Publication Data
US 2019/0170544 A1 Jun. 6, 2019

(30) Foreign Application Priority Data

Dec. 6, 2017 (JP) .................................. 2017-234428

(51) Int. Cl.
| G01D 11/30 | (2006.01) |
| B60R 11/02 | (2006.01) |
| B60R 11/04 | (2006.01) |
| H04N 5/225 | (2006.01) |
| B60R 1/04 | (2006.01) |
| B60R 11/00 | (2006.01) |
| B60R 1/12 | (2006.01) |

(52) U.S. Cl.
CPC ................ G01D 11/30 (2013.01); B60R 1/04 (2013.01); B60R 11/0235 (2013.01); B60R 11/04 (2013.01); H04N 5/2252 (2013.01); B60R 2001/1253 (2013.01); B60R 2011/0033 (2013.01)

(58) Field of Classification Search
None
See application file for complete search history.

(56) References Cited

U.S. PATENT DOCUMENTS

| 6,353,392 | B1 * | 3/2002 | Schofield ........... B60H 1/00785 318/444 |
| 9,487,161 | B2 * | 11/2016 | Rawlings ................ B60R 11/04 |
| 9,573,525 | B2 * | 2/2017 | Minikey, Jr. ............. B60R 1/04 |
| 2006/0132603 | A1 * | 6/2006 | Sato ........................ B60R 11/04 348/148 |

(Continued)

FOREIGN PATENT DOCUMENTS

| EP | 3 057 305 A1 | 8/2016 |
| JP | 2003-48491 A | 2/2003 |

(Continued)

Primary Examiner — William B Perkey
(74) Attorney, Agent, or Firm — Oliff PLC

(57) ABSTRACT

There is provided a sensor mounting structure, the structure including (i) a sensor device that detects at least information in front of a vehicle, (ii) a support member that houses part of the sensor device and is attached to a base member provided on an inner surface of a front windshield glass, and (iii) a display device that displays at least an image of what is in back of the vehicle, the display device being attached such that its angle is adjustable, to a lower end portion of an arm member having upper end portion that is attached to the support member. A space is formed between an outer surface of the part of the sensor device housed in the support member and an inner surface of the support member.

10 Claims, 13 Drawing Sheets

(56) References Cited

U.S. PATENT DOCUMENTS

| | | | |
|---|---|---|---|
| 2008/0231704 A1 | 9/2008 | Schofield et al. | |
| 2012/0006907 A1* | 1/2012 | Niemann | B60H 1/00792 |
| | | | 236/44 C |
| 2015/0251605 A1* | 9/2015 | Uken | H04N 5/2257 |
| | | | 248/467 |
| 2016/0091714 A1* | 3/2016 | Hui | H04N 5/2251 |
| | | | 359/512 |
| 2016/0229346 A1* | 8/2016 | Oh | B60R 1/12 |
| 2017/0341491 A1 | 11/2017 | Nakagawa | |
| 2019/0170545 A1* | 6/2019 | Higashimachi | B60R 11/04 |

FOREIGN PATENT DOCUMENTS

| | | |
|---|---|---|
| KR | 10-2016-0097923 A | 8/2016 |
| WO | 03/065084 A1 | 8/2003 |
| WO | 2011/041301 A2 | 4/2011 |
| WO | 2014/052658 A1 | 4/2014 |

* cited by examiner

SENSOR MOUNTING STRUCTURE

CROSS-REFERENCE TO RELATED APPLICATION

This application claims priority under 35 USC 119 from Japanese Patent Application No. 2017-234428 filed on Dec. 6, 2017, the disclosure of which is incorporated by reference herein in its entirety.

BACKGROUND

Technical Field

The present disclosure relates to a sensor mounting structure.

Related Art

Conventionally, structures have been proposed where, when a driving assist camera that images the environment in front of a vehicle is provided on the upper portion of the inner surface of a front windshield glass, a rearview mirror (inner mirror) is attached to the lower side of the camera in order to achieve a balance between ensuring fields of view for the camera and the driver and ensuring a field of view for the rearview mirror (see Japanese Patent Application Laid-open (JP-A) No. 2003-48491).

However, if an upper end portion of an arm member, to lower end portion of which the inner mirror (display device) is attached such that its angle is adjustable, is attached to a member that supports the camera, there is the potential for the load that arises when the driver grips and moves the inner mirror to adjust the angle of the inner mirror to act on the member supporting the camera, thereby shifting the optical axis of the camera.

SUMMARY

The present disclosure obtains a sensor mounting structure which, even when an occupant (driver) adjusts the angle of a display device, can inhibit shifting of the optical axis of a sensor device provided on the inner surface of a front windshield glass.

A sensor mounting structure pertaining to a first aspect of the present disclosure includes a sensor device, a support member, and a display device. The sensor device detects at least information in front of a vehicle. The support member houses part of the sensor device and is attached to a base member provided on an inner surface of a front windshield glass. The display device displays at least an image of what is in back of the vehicle. The display device is attached, such that its angle is adjustable, to a lower end portion of an arm member, an upper end portion of which is attached to the support member. A space is formed between an outer surface of the part of the sensor device housed in the support member and an inner surface of the support member.

According to the first aspect, the space is formed between the outer surface of the part of the sensor device housed in the support member and the inner surface of the support member. Here, loads are not transmitted where the space is formed. Consequently, compared to a case where the space is not formed between the outer surface of the part of the sensor device and the inner surface of the support member, the load that acts on the support member in a case in which the occupant (driver) adjusts (moves) the angle of the display device is inhibited from acting via the arm member on the sensor device. Namely, shifting of the optical axis of the sensor device is inhibited.

A second aspect of the present disclosure is the sensor mounting structure pertaining to the first aspect, wherein the support member is formed in a shape of a casing having a bottom wall. The upper end portion of the arm member is attached to the bottom wall. The space is formed at least between a bottom surface of the sensor device and an inner surface of the bottom wall.

According to the second aspect, the space is formed at least between the bottom surface of the sensor device and the inner surface of the bottom wall to which the upper end portion of the arm member is attached. Here, loads are not transmitted where the space is formed. Consequently, compared to a case where the space is not formed between the bottom surface of the sensor device and the inner surface of the bottom wall to which the upper end portion of the arm member is attached, the load that acts on the support member when the occupant (driver) adjusts (moves) the angle of the display device is more effectively inhibited from acting via the arm member on the sensor device. Namely, shifting of the optical axis of the sensor device is more effectively inhibited.

A third aspect of the present disclosure is the sensor mounting structure pertaining to the second aspect, wherein a bracket having longitudinal direction, which coincides with the vehicle front and rear direction, is provided on the bottom wall. The upper end portion of the arm member is attached to the bracket.

According to the third aspect, the bracket having longitudinal direction, which coincides with the vehicle front and rear direction, is provided on the bottom wall of the support member formed in the shape of a casing, and the upper end portion of the arm member is attached to the bracket. Consequently, the rigidity, in the vehicle front and rear direction, of the bottom wall including the bracket is improved, and vibration, along the vehicle front and rear direction, of the display device during travel is effectively inhibited.

A fourth aspect of the present disclosure is the sensor mounting structure pertaining to any one of the first aspect to the third aspect, wherein the support member is fastened, together with the sensor device, to the base member.

According to the fourth aspect, the support member that supports the display device is fastened, together with the sensor device, to the base member. Consequently, compared to a case where the support member is fastened to the base member separately from the sensor device, the number of parts (fasteners) can be reduced.

A fifth aspect of the present disclosure is the sensor mounting structure pertaining to the fourth aspect, wherein the support member and the sensor device are fastened to the base member at four points spaced apart from each other in the vehicle front and rear direction and the vehicle width direction.

According to the fifth aspect, the support member and the sensor device are fastened to the base member at four points spaced apart from each other in the vehicle front and rear direction and the vehicle width direction. Consequently, compared to a case where, for example, the support member and the sensor device are fastened at three points to the base member, the display device is more stably supported with respect to vibration in the vehicle front and rear direction and the vehicle width direction.

A sixth aspect of the present disclosure is the sensor mounting structure pertaining to any one of the first aspect to the fifth aspect, wherein the display device is an electronic inner mirror.

According to the sixth aspect, the display device is an electronic inner mirror. The electronic inner mirror is a weighty object heavier than an ordinary optical mirror, but because the support member is formed in a shape (the shape of a casing) capable of housing part of the sensor device, rigidity for supporting the electronic inner mirror is ensured and the electronic inner mirror is stably supported.

A seventh aspect of the present disclosure is the sensor mounting structure pertaining to any one of the first aspect to the sixth aspect, wherein the sensor device is configured to include a camera or a sensor that uses an infrared laser beam.

According to the seventh aspect, the sensor device is configured to include a camera or a sensor that uses an infrared laser beam. Consequently, compared to a case where the sensor device is not configured to include a camera or a sensor that uses an infrared laser beam, detection performance with respect to the peripheral information of the vehicle is improved.

An eighth aspect of the present disclosure is the sensor mounting structure pertaining to any one of the first aspect to the seventh aspect, further including a cover member that covers the support member. The shortest distance between an upper edge portion at a longitudinal direction end portion of the display device and the cover member is longer than the shortest distance between the upper edge portion at a longitudinal direction central portion of the display device and the cover member.

According to the eighth aspect, the shortest distance between the upper edge portion at the longitudinal direction end portion of the display device and the cover member is longer than the shortest distance between the upper edge portion at the longitudinal direction central portion of the display device and the cover member. Consequently, space for the occupant to insert his/her fingers to the upper side of the upper edge portion at the longitudinal direction end portion of the display device is ensured.

A ninth aspect of the present disclosure is the sensor mounting structure pertaining to the eighth aspect, wherein the cover member has a stepped portion in a portion thereof that opposes the upper edge portion at the longitudinal direction end portion of the display device.

According to the ninth aspect, the cover member has the stepped portion in the portion thereof that opposes the upper edge portion at the longitudinal direction end portion of the display device. Consequently, the space for the occupant to insert his/her fingers to the upper side of the upper edge portion at the longitudinal direction end portion of the display device becomes wider in the vertical direction, and that space is excellently ensured.

A tenth aspect of the present disclosure is the sensor mounting structure pertaining to the eighth aspect or the ninth aspect, wherein the cover member covers the support member in avoidance of the arm member.

According to the tenth aspect, the cover member covers the support member in avoidance of the arm member. Consequently, compared to a case where the cover member also covers the arm member, the shape of the cover member is simplified.

According to the first aspect of the present disclosure, even when the occupant (driver) adjusts the angle of the display device, shifting of the optical axis of the sensor device attached to the inner surface of the front windshield glass can be inhibited.

According to the second aspect, shifting of the optical axis of the sensor device can be more effectively inhibited.

According to the third aspect, vibration, along the vehicle front and rear direction, of the display device during travel can be effectively inhibited.

According to the fourth aspect, the number of parts (fasteners) can be reduced.

According to the fifth aspect, the display device can be stably supported.

According to the sixth aspect, the electronic inner mirror, which is a weighty object, can be stably supported.

According to the seventh aspect, detection performance with respect to the peripheral information of the vehicle can be improved.

According to the eighth aspect, space for the occupant to insert his/her fingers to the upper side of the upper edge portion at the longitudinal direction end portion of the display device can be ensured.

According to the ninth aspect, the space for the occupant to insert his/her fingers to the upper side of the upper edge portion at the longitudinal direction end portion of the display device can be widened in the vertical direction, and that space can be excellently ensured.

According to the tenth aspect, the shape of the cover member can be simplified.

BRIEF DESCRIPTION OF THE DRAWINGS

An exemplary embodiment of the present disclosure will be described in detail based on the following figures, wherein.

DETAILED DESCRIPTION

Figure 1:
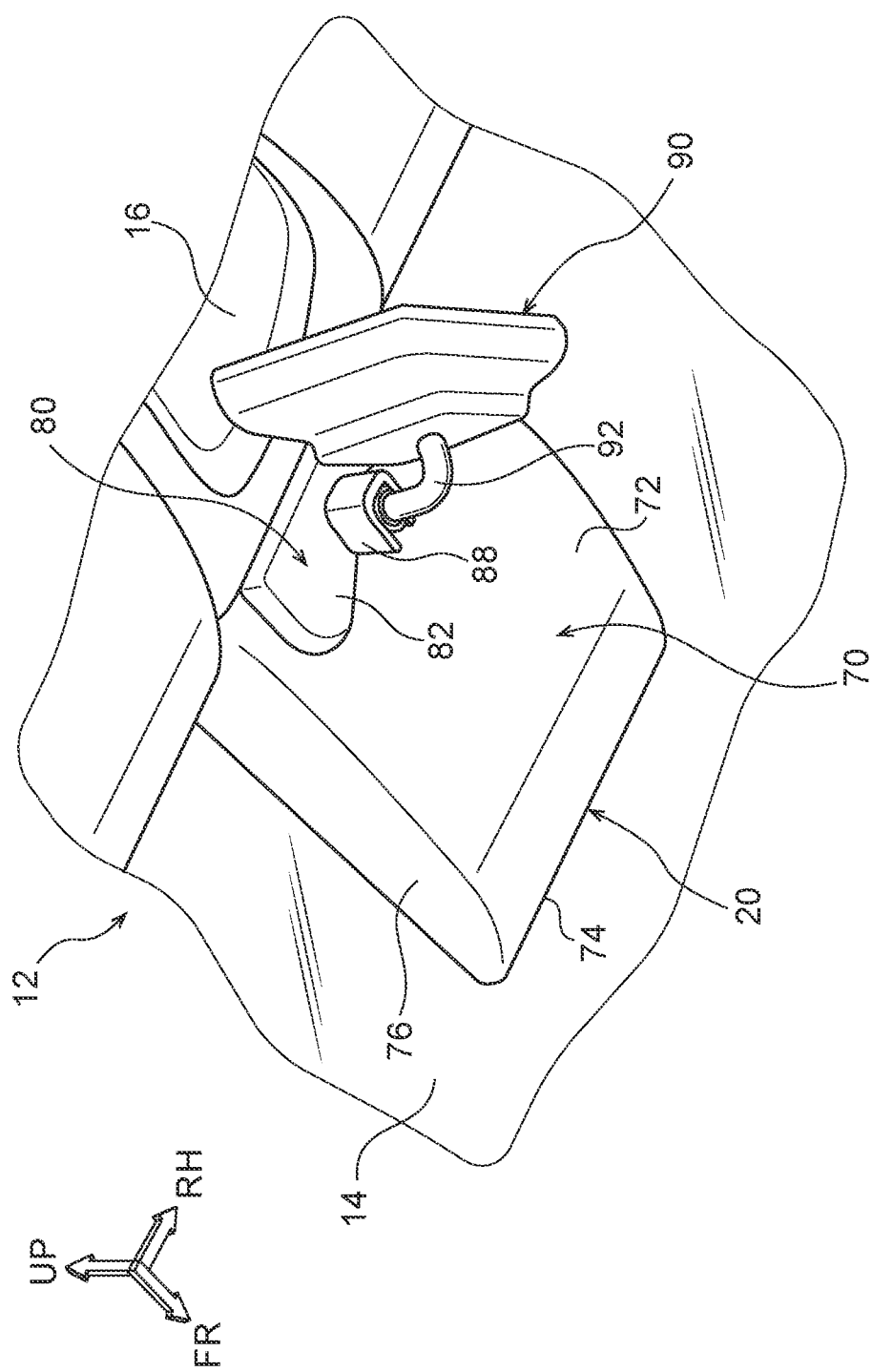
FIG. 1 is a perspective view showing a sensor unit equipped with a sensor mounting structure pertaining to the embodiment as seen from a cabin side.

An embodiment pertaining to the present disclosure will be described in detail below referring to the drawings. For convenience of explanation, arrow UP appropriately shown in the drawings indicates a vehicle upward direction, arrow FR indicates a vehicle forward direction, and arrow RH indicates a vehicle rightward direction. Consequently, when the directions of upper/lower, front/rear, and right/left are used without further specification in the following description, these will be understood to mean upper/lower in the vehicle vertical direction, front/rear in the vehicle front and rear direction, and right/left in the vehicle right and left direction (the vehicle width direction).

Figure 2:
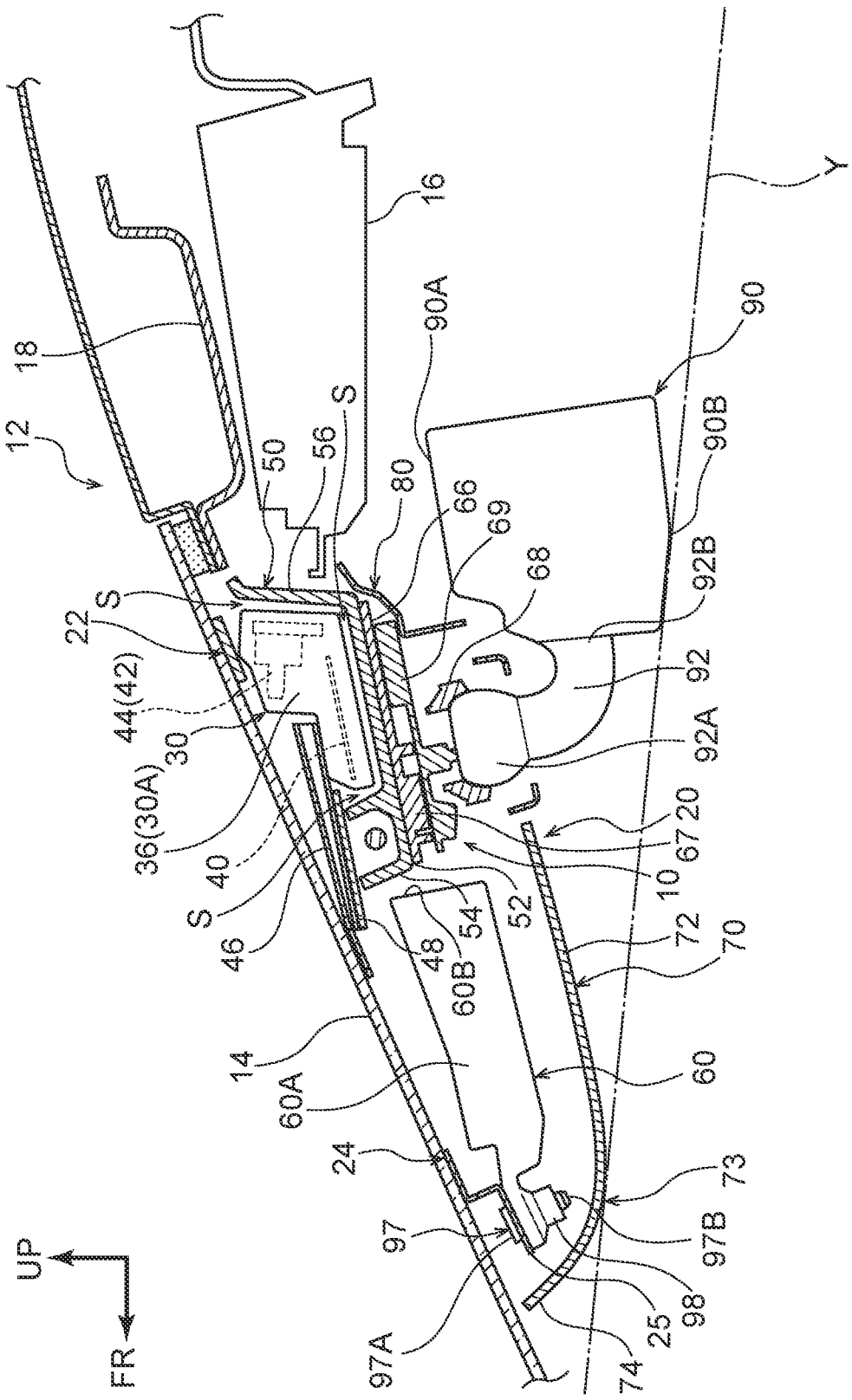
FIG. 2 is a side sectional view showing the sensor mounting structure pertaining to the embodiment.

As shown in FIG. 1 and FIG. 2, a sensor unit 20 equipped with a sensor mounting structure 10 pertaining to the embodiment and mounted in a vehicle 12 is provided on an inner surface of a front windshield glass 14 on the vehicle front and upper side of an electronic inner mirror 90 serving as an example of a display device that displays at least an image of what is in back of the vehicle 12.

Figure 3:
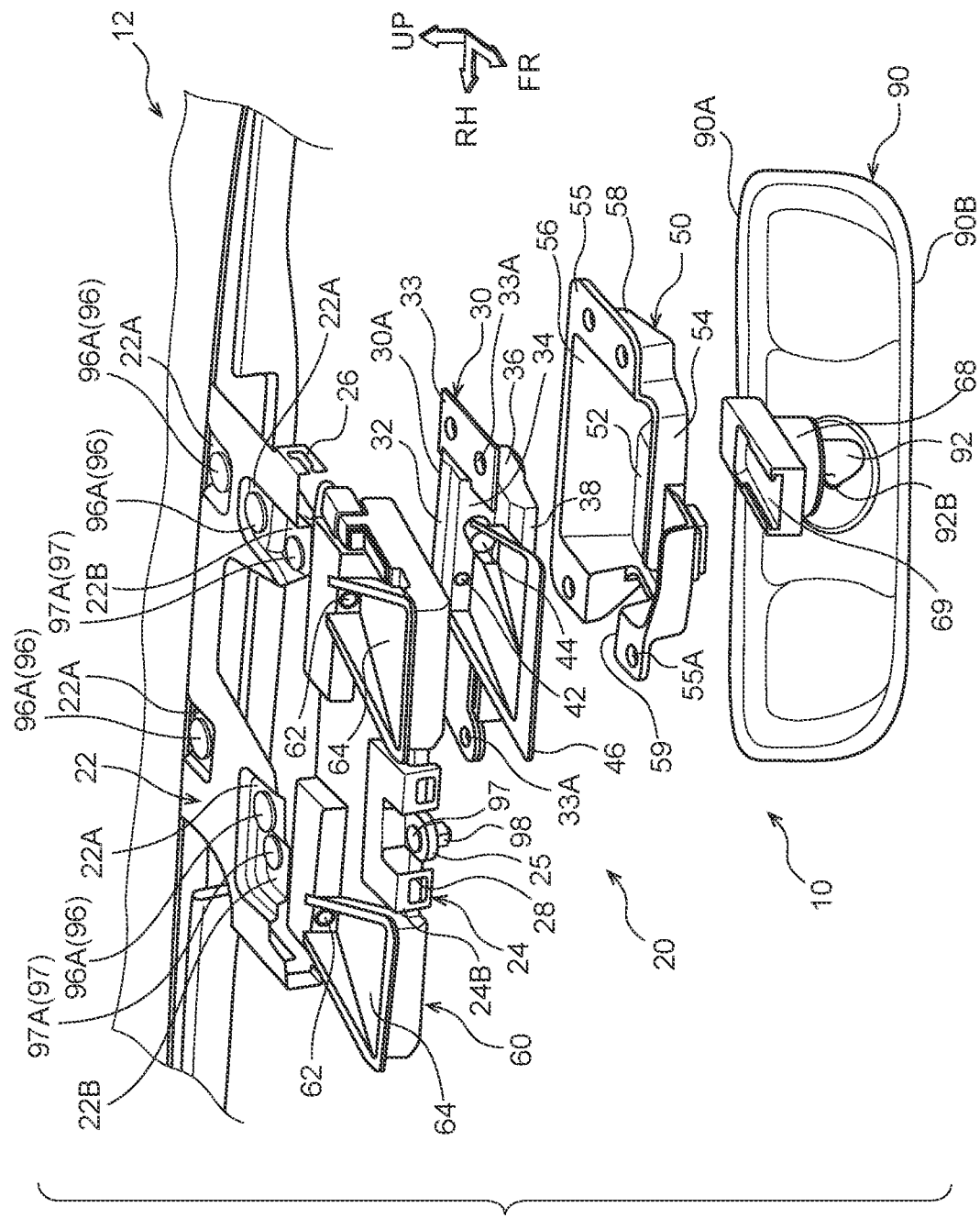
FIG. 3 is an exploded perspective view showing part of the sensor unit equipped with the sensor mounting structure pertaining to the embodiment.
Figure 4:
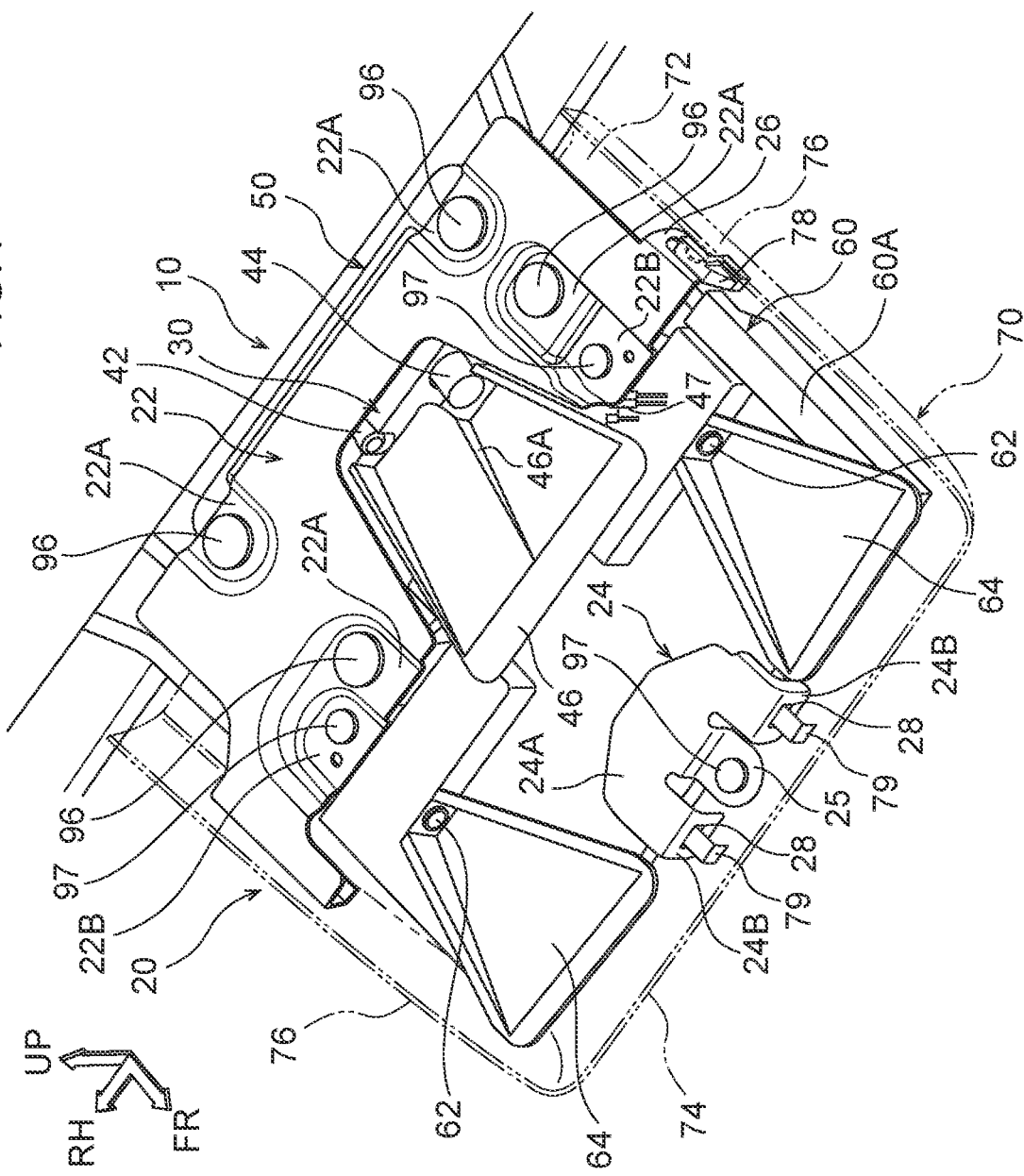
FIG. 4 is a perspective view showing the sensor mounting structure pertaining to the embodiment as seen from the vehicle upper side.

Specifically, as shown in FIG. 3 and FIG. 4, the sensor unit 20 is equipped with a base member 22 attached by an adhesive, for example, to the inner surface of the front windshield glass 14 and on the vehicle upper side. The base member 22 is formed of sheet metal in a substantially U-shape as seen in a plan view.

Furthermore, recessed portions 22A are formed, on both right and left sides, in the rear end portion of the base member 22, and a through hole (not shown in the drawings) that is circular in shape as seen in a plan view is formed in the bottom surface of each recessed portion 22A. Additionally, shaft portions 96B (see FIG. 7 and FIG. 8) of weld bolts 96 serving as fasteners are inserted through the through holes, and head portions 96A of the weld bolts 96 are secured by welding to the bottom surfaces of the recessed portions 22A around the through holes.

Furthermore, recessed portions 22A are also formed, on both right and left sides, in the front portions of the base member 22, and a through hole (not shown in the drawings) that is circular in shape as seen in a plan view is formed in the bottom surface of each recessed portion 22A. Additionally, shaft portions 96B (see FIG. 7 and FIG. 8) of weld bolts 96 are inserted through these through holes also, and head portions 96A of the weld bolts 96 are secured by welding to the bottom surfaces of the recessed portions 22A around the through holes.

A later-described locator/telephoto camera device 30 and a housing 50 that houses part of the locator/telephoto camera device 30 are jointly fastened (together fastened) to the base member 22 by these four weld bolts 96 and four nuts 98 (see FIG. 7 and FIG. 8). Namely, the locator/telephoto camera device 30 and the housing 50 are fastened to the base member 22 at four places (four points) spaced apart from each other in the front and rear direction and the right and left direction.

Furthermore, a recessed portion 22B is formed in the vehicle width direction outer side of the bottom surface of the recessed portion 22A formed in the right front portion of the base member 22, and a through hole (not shown in the drawings) that is circular in shape as seen in a plan view is formed in the bottom surface of the recessed portion 22B. Additionally, a shaft portion 97B (see FIG. 7 and FIG. 8) of a weld bolt 97 serving as a fastener that is smaller in diameter than the weld bolt 96 is inserted through the through hole, and a head portion 97A of the weld bolt 97 is secured by welding to the bottom surface of the recessed portion 22B around the through hole.

Furthermore, a recessed portion 22B is also formed in the vehicle front side of the bottom surface of the recessed portion 22A formed in the left front portion of the base member 22, and a through hole (not shown in the drawings) that is circular in shape as seen in a plan view is formed in the bottom surface of the recessed portion 22B. Additionally, a shaft portion 97B (see FIG. 7 and FIG. 8) of a weld bolt 97 is inserted through this through hole also, and a head portion 97A of the weld bolt 97 is secured by welding to the bottom surface of the recessed portion 22B around the through hole.

Both right and left sides of the rear end portion of a later-described stereo camera device 60 are fastened to the base member 22 by these two weld bolts 97 and two nuts (not shown in the drawings).

Moreover, an upper surface 24A of a secondary base member 24 that is smaller than the base member 22 is attached by an adhesive, for example, to the inner surface of the vehicle width direction substantially central portion of the front windshield glass 14 on the vehicle front side of the base member 22. The secondary base member 24 is formed of sheet metal in a substantially rectangular shape as seen in a plan view, and a tongue portion 25 is formed in the vehicle width direction central portion of the front side of the secondary base member 24 as a result of both sides including the front end portion being cut out.

The base portion of the tongue portion 25 is formed bent such that the tongue portion 25 is disposed in a lower position (more in the vehicle downward direction) than the upper surface 24A of the secondary base member 24, and a through hole (not shown in the drawings) that is circular in shape as seen in a plan view is formed in the center of the tongue portion 25. Additionally, a shaft portion 97B of a weld bolt 97 (see FIG. 2) is inserted through the through hole, and a head portion 97A of the weld bolt 97 is secured by welding to the upper surface of the tongue portion 25 around the through hole.

The central side of the front end portion of the stereo camera device 60 is fastened to the secondary base member 24 by this one weld bolt 97 and one nut 98 (see FIG. 2). Namely, the stereo camera device 60 is fastened to the secondary base member 24 and the base member 22 at a total of three places (three points)—one place on the front side and two places on the rear side.

Furthermore, engagement receiving portions 26, with which a right and left pair of engagement claws 78 provided on a later-described primary cover 70 engage, are formed as a right and left pair on both vehicle width direction end portions of the base member 22 (illustration of the right-side engagement claw 78 and engagement receiving portion 26 is omitted). The engagement receiving portions 26 are each formed in a substantially J-shape as seen in a side view, a vehicle front side of which becomes an open side, and the engagement claws 78 are inserted from the vehicle front side into and become engaged with the engagement receiving portions 26.

Furthermore, front end portions 24B of the secondary base member 24 on both right and left sides of the tongue portion 25 are bent in the vehicle downward direction, and engagement receiving holes 28 serving as engagement receiving portions with which engagement claws 79 provided on the primary cover 70 engage are formed in these front end portions 24B also. The engagement receiving holes 28 are each formed in a substantially rectangular shape having a longitudinal direction that coincides with the vehicle width direction as seen in a front view, and the engagement claws 79 are inserted from the vehicle front side into and become engaged with the engagement receiving holes 28.

As shown in FIG. 2 to FIG. 6, the sensor unit 20 is equipped with a locator/telephoto camera device 30, which serves as a sensor device and has a device body 30A to which a later-described locator camera 42 and a telephoto camera 44 are attached, and a housing 50, which serves as a support member that houses (covers) from the vehicle lower side at least the lower portion (a later-described electronic substrate 40) of the locator/telephoto camera device 30.

Figure 6:
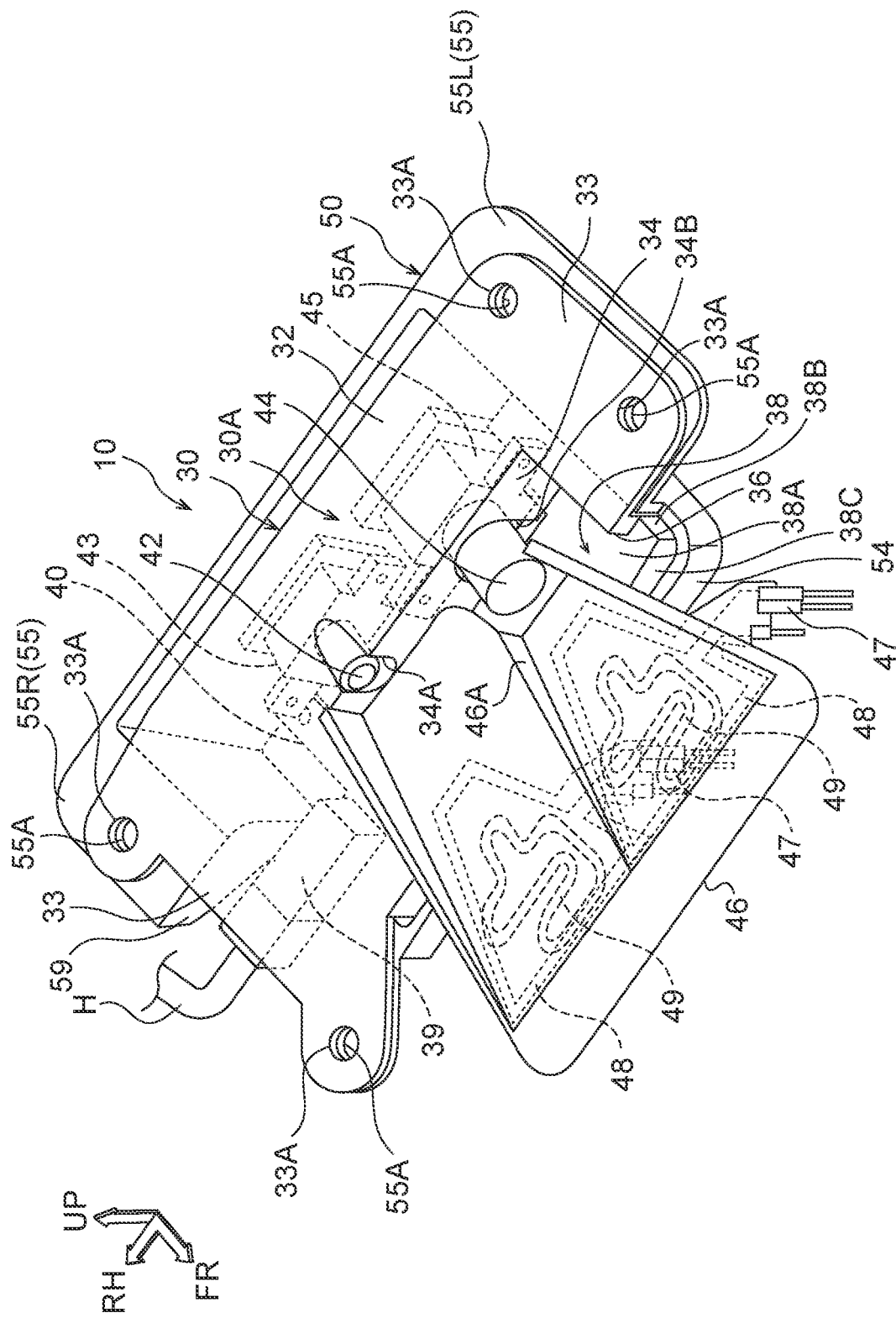
FIG. 6 is a perspective view showing a locator/telephoto camera device and a housing that configure the sensor mounting structure pertaining to the embodiment.

The device body 30A of the locator/telephoto camera device 30 is formed of a metal such as aluminum alloy and has a top wall 32, a front wall 34, and side walls 36 (see FIG. 6). Namely, the device body 30A is not provided with a rear wall or a bottom wall, so the vehicle rear side and the vehicle lower side of the device body 30A are open. Because of this, the device body 30A has a configuration in which the locator camera 42 and the telephoto camera 44 can be loaded therein from the open side thereof.

Figure 5:
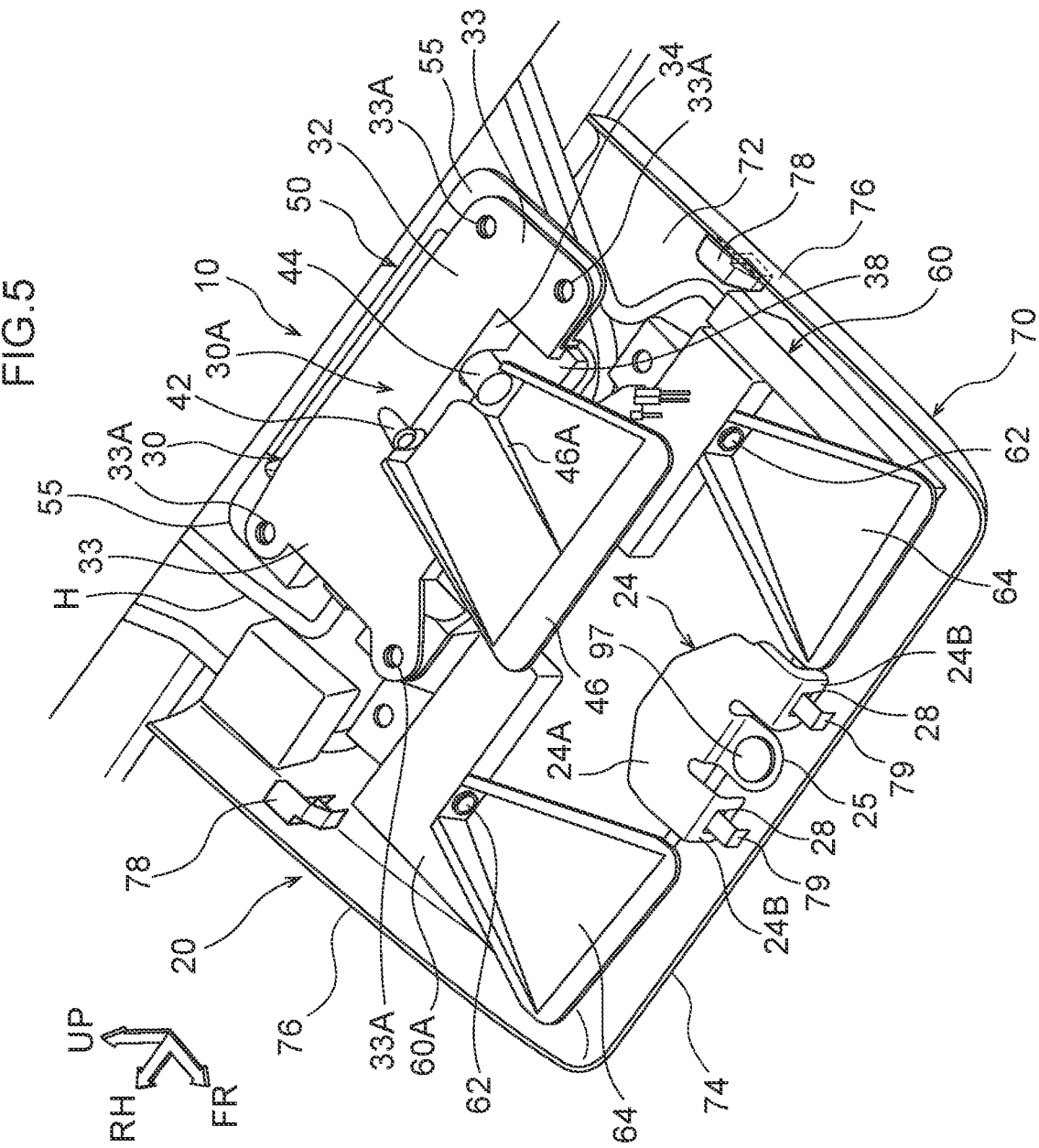
FIG. 5 is a perspective view showing the sensor mounting structure pertaining to the embodiment as seen from the vehicle upper side and with a base member removed therefrom.

As shown in FIG. 3, FIG. 5, and FIG. 6, flange portions 33 that protrude outward in the vehicle width direction beyond the side walls 36 and in the vehicle forward direction beyond the front wall 34 are integrally formed on both right and left end portions of the top wall 32. Through holes 33A, which are circular in shape as seen in a plan view and are for allowing the weld bolts 96 provided in the base member 22 to be inserted therethrough, are formed apart from each other in the vehicle front and rear direction in each flange portion 33.

A protruding portion 38, which has the same width as the front wall 34 and protrudes in the vehicle forward direction, is integrally formed on the lower end portion of the front wall 34. The protruding portion 38 has an upper wall 38A that is continuous with the front wall 34, side walls 38B, and a front wall 38C that is continuous with the upper wall 38A and the side walls 38B (see FIG. 6), and the front end portion of the protruding portion 38 protrudes in the vehicle forward direction beyond the front end portions of the flange portions 33.

Additionally, the device body 30A of the locator/telephoto camera device 30 retains, in a side-by-side state in the vehicle width direction, the locator camera 42, which serves as a driving assist (for self-driving) sensor that detects peripheral information (information such as the positions, directions, and distances of objects existing at least in front) of the vehicle 12, and the telephoto camera 44, which likewise serves as a driving assist (for self-driving) sensor.

It will be noted that the locator camera 42 and the telephoto camera 44, which are a right and left pair of cameras, can be disposed in close proximity to each other because they detect peripheral information different from peripheral information detected by later-described stereo cameras 62. Furthermore, the locator camera 42 is disposed in a higher position (more in the vehicle upward direction) than the telephoto camera 44.

Moreover, as shown in FIG. 6, the locator camera 42 and the telephoto camera 44, including also their respective camera bodies 43 and 45, have different front and rear direction lengths (focal lengths). That is, the vehicle front and rear direction length of the telephoto camera 44 (including also its camera body 45) is formed longer than that of the locator camera 42 (including also its camera body 43).

Additionally, the camera body 43 of the locator camera 42 and the camera body 45 of the telephoto camera 44 are each attached and anchored by screws, for example, to the front wall 34 of the device body 30A. Consequently, an exposure hole 34A for exposing the locator camera 42 to the vehicle front side and an exposure hole 34B for exposing the telephoto camera 44 to the vehicle front side are formed side-by-side in the vehicle width direction in the front wall 34.

It will be noted that because the locator camera 42 is disposed in a higher position than the telephoto camera 44, the exposure hole 34A may also be formed by cutting out part of the front side of the top wall 32. Furthermore, the locator camera 42 and the telephoto camera 44 are electrically connected to and operated by a shared (single) electronic substrate 40.

The electronic substrate 40 is formed substantially in the shape of a rectangular flat plate, and the peripheral edge portion thereof is attached by screws, for example, to the side walls 36 and the protruding portion 38 of the device body 30A. Consequently, the electronic substrate 40 can also be thought of as the bottom wall of the locator/telephoto camera device 30. It will be noted that a connector 39 for connecting wiring H to the electronic substrate 40 is provided on the right end portion (one vehicle width direction end portion), and in the vehicle front and rear direction substantially central portion, of the electronic substrate 40 (see FIG. 6).

Furthermore, as shown in FIG. 2 to FIG. 6, the rear end portion of an angle-of-view hood member (hereinafter called "the hood member") 46 formed of a resin material such as polypropylene (PP) is attached to the upper wall 38A of the protruding portion 38 of the device body 30A. The hood member 46 is formed in the shape of an isosceles trapezoid that widens in the vehicle width direction heading in the vehicle forward direction as seen in a plan view, and more than half of the hood member 46 protrudes in the vehicle forward direction beyond the front end portion of the protruding portion 38.

Furthermore, engagement claws (not shown in the drawings) are integrally formed on both right and left sides of the rear end portion of the hood member 46, and engagement receiving holes (not shown in the drawings) are formed in both right and left sides of the rear end portion of the upper wall 38A of the protruding portion 38. Namely, the hood member 46 is attached to the upper wall 38A of the protruding portion 38 as a result of the engagement claws becoming engaged and fitted together with the engagement receiving holes.

Moreover, because the telephoto camera 44 is disposed in a lower position (more in the vehicle downward direction) than the locator camera 42, the hood member 46 is formed in such a way that its height is different at its vehicle width direction substantially central portion so that the locator camera 42 side is in a higher position and the telephoto camera 44 side is in a lower position. That is, a stepped portion 46A is formed in the vehicle width direction substantially central portion of the hood member 46.

It will be noted that the upper surface of the front end portion of the hood member 46 does not contact (contactless) the inner surface of the front windshield glass 14. Additionally, the hood member 46 is colored black, for example, in order to inhibit or prevent the reflection of light that has passed through the front windshield glass 14 (reflection into the locator camera 42 and the telephoto camera 44).

Furthermore, as shown in FIG. 2 and FIG. 6, heaters 48 serving as heating elements are provided via heat-insulating sheets (not shown in the drawings) serving as heat-insulating materials on the lower surface of the hood member 46. Specifically, heaters 48 each formed in the shape of an isosceles trapezoid that widens in the vehicle width direction heading in the vehicle forward direction as seen in a plan view are provided on the lower surface of the right half of the hood member 46 on the vehicle front side of the locator camera 42 and on the lower surface of the left half of the hood member 46 on the vehicle front side of the telephoto camera 44.

An electrical heating wire 49 is provided inside each heater 48, and a connecter 47 for connecting wiring (not shown in the drawings) to the electrical heating wire 49 is provided on the left end portion (the other vehicle width direction end portion) of each heater 48. It will be noted that the hood member 46 is not limited to a configuration in which it is provided separately on the protruding portion 38 of the device body 30A of the locator/telephoto camera device 30 and may also, for example, have a configuration in which it is formed integrally with the base member 22.

That is, the hood member 46, too, may be formed of a metal such as aluminum alloy integrally with the base member 22. In this case, the heaters 48 can be provided (stuck) to the lower surface of the hood member 46 without involving heat-insulating sheets. Furthermore, engagement receiving holes do not need to be formed in the upper wall 38A of the protruding portion 38 of the device body 30A of the locator/telephoto camera device 30.

As shown in FIG. 2, FIG. 3, and FIG. 6 to FIG. 8, the housing 50 is formed of a metal such as aluminum alloy and has a bottom wall 52 and also a front wall 54, a rear wall 56, and right and left side walls 58 that are integrally and erectly provided around the bottom wall 52. Namely, the housing 50 is formed in the shape of a casing having a vehicle upper side that is open.

Additionally, flange portions 55, which are substantially rectangular in shape as seen in a plan view and protrude outward in the vehicle width direction such that they can be laid on top of the flange portions 33 of the locator/telephoto camera device 30 (the device body 30A), are integrally formed on the upper end portions of the right and left side walls 58. It will be noted that, below, when distinguishing between right and left and describing the right and left side walls 58 and the right and left flange portions 55, an "L" or an "R" will be added after the number.

Through holes 55A, which are circular in shape as seen in a plan view and are for allowing the weld bolts 96 provided in the base member 22 to be inserted therethrough, are formed apart from each other in the vehicle front and rear direction in each flange portion 55. Namely, when laying the flange portions 55 of the housing 50 on top of the flange portions 33 of the locator/telephoto camera device 30 (the device body 30A) and jointly fastening them to the base member 22, the through holes 33A in the flange portions 33 and the through holes 55A in the flange portions 55 communicate with each other (see FIG. 6).

Additionally, the housing 50 houses at least the lower portion (the electronic substrate 40) of the locator/telephoto camera device 30 in a state in which the flange portions 55 of the housing 50 are laid on top of the flange portions 33 of the locator/telephoto camera device 30 (the device body 30A) (see FIG. 6). It will be noted that a space (gap) S is formed between the outer surface of the locator/telephoto camera device 30 (the device body 30A and the electronic substrate 40) housed inside the housing 50 and the inner surface of the housing 50 (see FIG. 2 and FIG. 13).

More specifically, a space S is formed between the lower surface of the electronic substrate 40 (the bottom surface of the locator/telephoto camera device 30) and the bottom surface inside the housing 50 (the inner surface of the bottom wall 52), between the rear surface of the locator camera 42 (the camera body 43) as well as the rear surface of the telephoto camera 44 (the camera body 45) and the rear surface inside the housing 50 (the inner surface of the rear wall 56), between the outer surfaces (side surfaces) of the side walls 36 of the locator/telephoto camera device 30 (the device body 30A) and the side surfaces inside the housing 50 (the inner surfaces of the side walls 58), and between the front surface of the front wall 38C of the protruding portion 38 and the front surface inside the housing 50 (the inner surface of the front wall 54).

In other words, the bottom surface inside the housing 50 (the inner surface of the bottom wall 52) is disposed away from the lower surface of the electronic substrate 40 (the bottom surface of the locator/telephoto camera device 30), the rear surface inside the housing 50 (the inner surface of the rear wall 56) is disposed away from the rear surface of the locator camera 42 (the camera body 43) and the rear surface of the telephoto camera 44 (the camera body 45), the side surfaces inside the housing 50 (the inner surfaces of the side walls 58) are disposed away from the outer surfaces (side surfaces) of the side walls 36 of the locator/telephoto camera device 30 (the device body 30A), and the front surface inside the housing 50 (the inner surface of the front wall 54) is disposed away from the front surface of the front wall 38C of the protruding portion 38.

Figure 8:
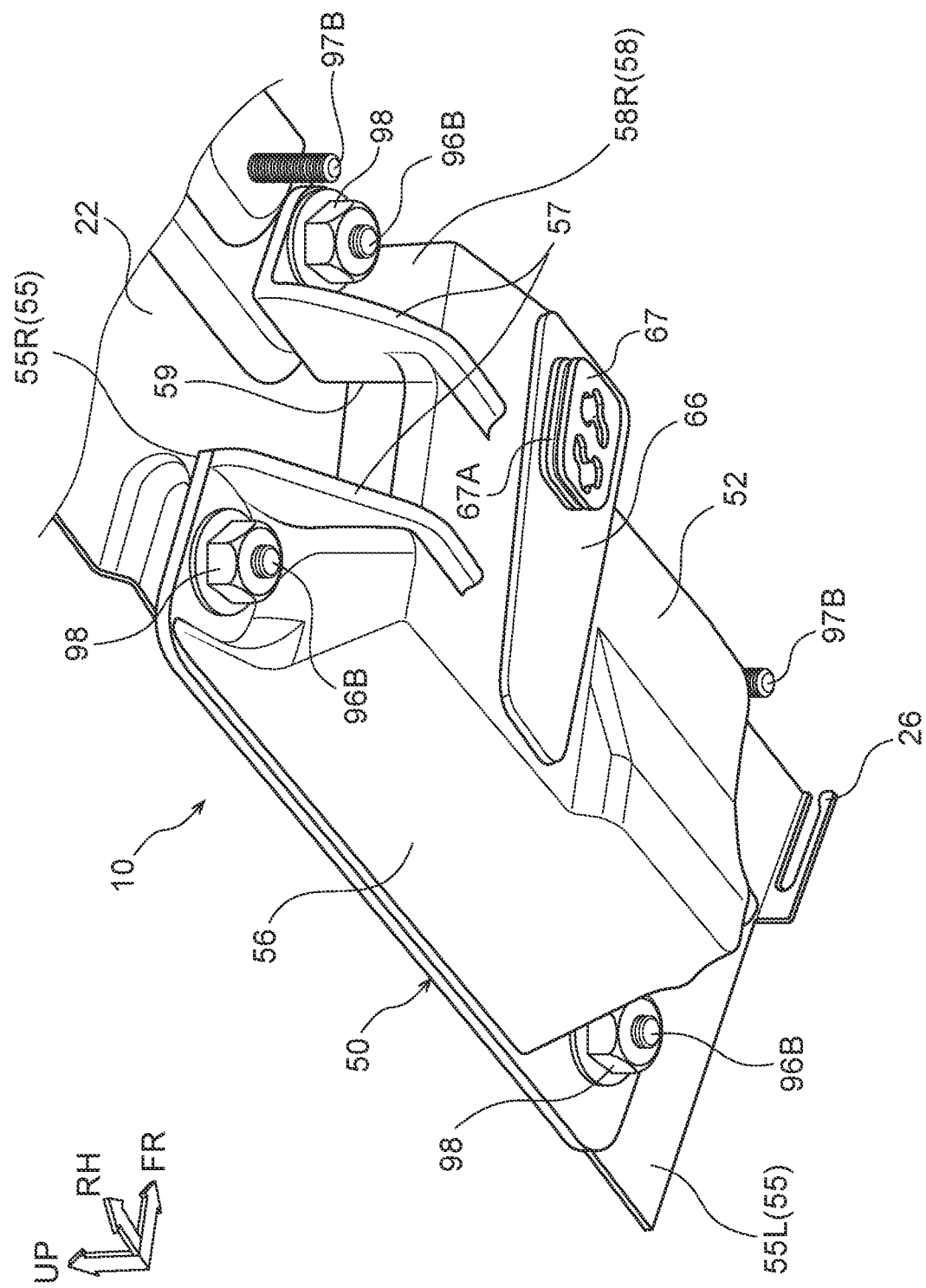
FIG. 8 is a perspective view showing the housing configuring the sensor mounting structure pertaining to the embodiment as seen from a lower right direction.

Furthermore, as shown in FIG. 6 and FIG. 8, a cutout portion 59, which serves as an open portion for allowing the connector 39 provided on the electronic substrate 40 of the locator/telephoto camera device 30 housed inside the housing 50 to project outward in the vehicle width direction, is formed in the right-side side wall 58R and flange portion 55R and between the through holes 55A spaced apart from each other in the vehicle front and rear direction.

It will be noted that the open portion formed in the housing 50 is not limited to the cutout portion 59 and may also, for example, be a hole portion (not shown in the drawings) formed in just the right-side side wall 58R or a hole portion (not shown in the drawings) formed to include the right-side side wall 58R and part of the base side of the right-side flange portion 55R so long as the open portion allows the connector 39 to project therethrough.

Moreover, a front and rear pair of ribs 57 for reinforcing the divided right-side flange portions 55R are integrally formed ranging from the lower surfaces on the cutout portion 59 side (the peripheral edge portion of the cutout portion 59) of the right-side flange portions 55R divided into front and rear flanges by the cutout portion 59 to the outer surface of the right-side side wall 58R and the outer surface of the bottom wall 52. Additionally, as shown in FIG. 7, a rib 57 for reinforcing the left-side flange portion 55L is also integrally formed ranging from the lower surface of the vehicle front and rear direction substantially central side of the left-side flange portion 55L to the outer surface of the left-side side wall 58L.

Figure 7:
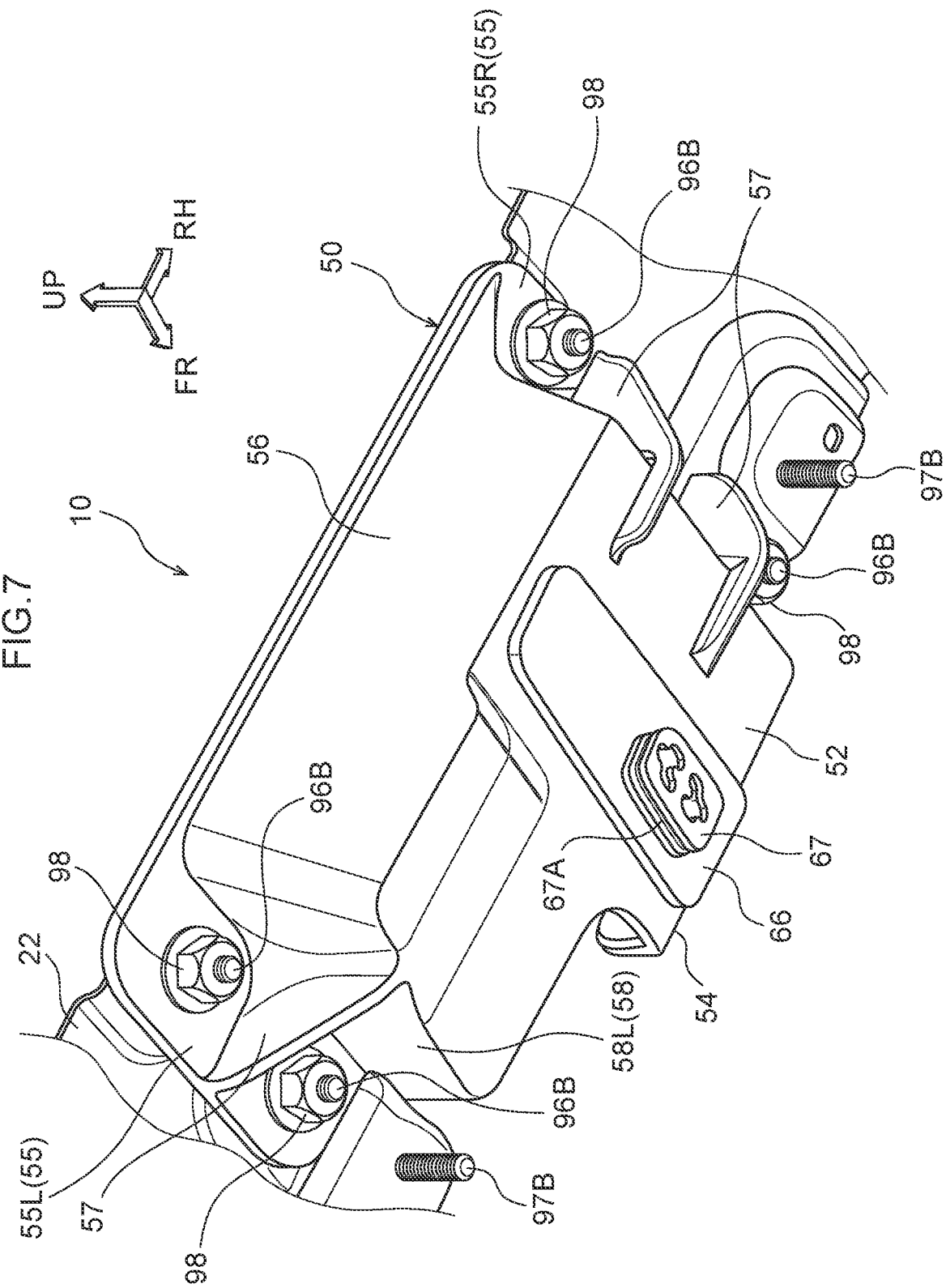
FIG. 7 is a perspective view showing the housing configuring the sensor mounting structure pertaining to the embodiment as seen from a lower left direction.
Figure 9:
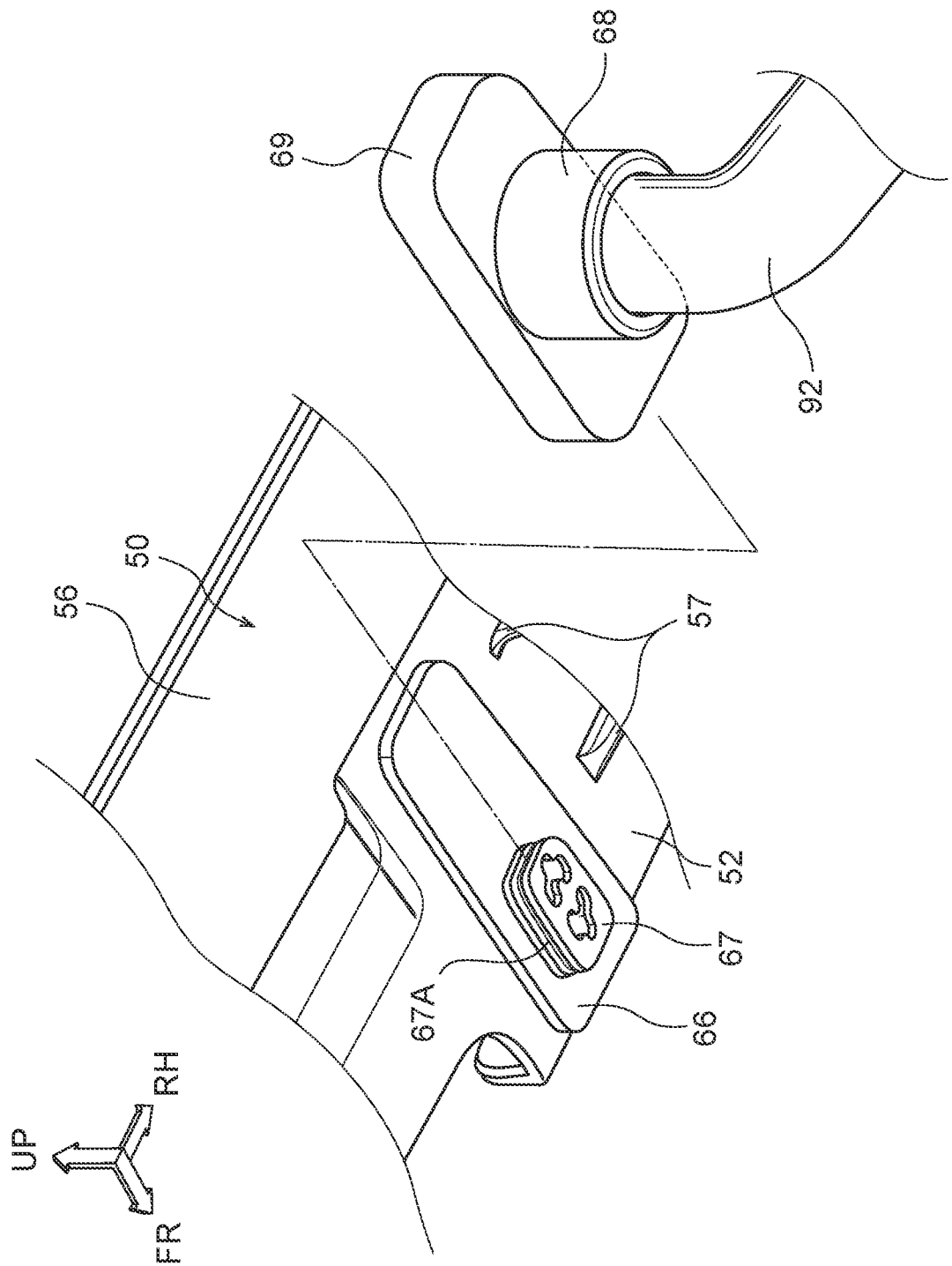
FIG. 9 is a perspective view showing the attachment of an electronic inner mirror to the housing configuring the sensor mounting structure pertaining to the embodiment.

Furthermore, as shown in FIG. 7 to FIG. 9, a mirror bracket 66 for attaching an electronic inner mirror 90 is provided in the vehicle width direction substantially central portion of the lower surface of the bottom wall 52. The mirror bracket 66 is formed substantially in the shape of a rectangular flat plate as seen in a bottom view that is long in the vehicle front and rear direction and short in the vehicle width direction (its longitudinal direction coincides with the vehicle front and rear direction), and a mating receiving portion 67 that is substantially rectangular in shape as seen in a bottom view and is for attaching a ball joint portion 68 is integrally and projectingly provided on the lower surface of the front end portion of the mirror bracket 66.

Figure 10:
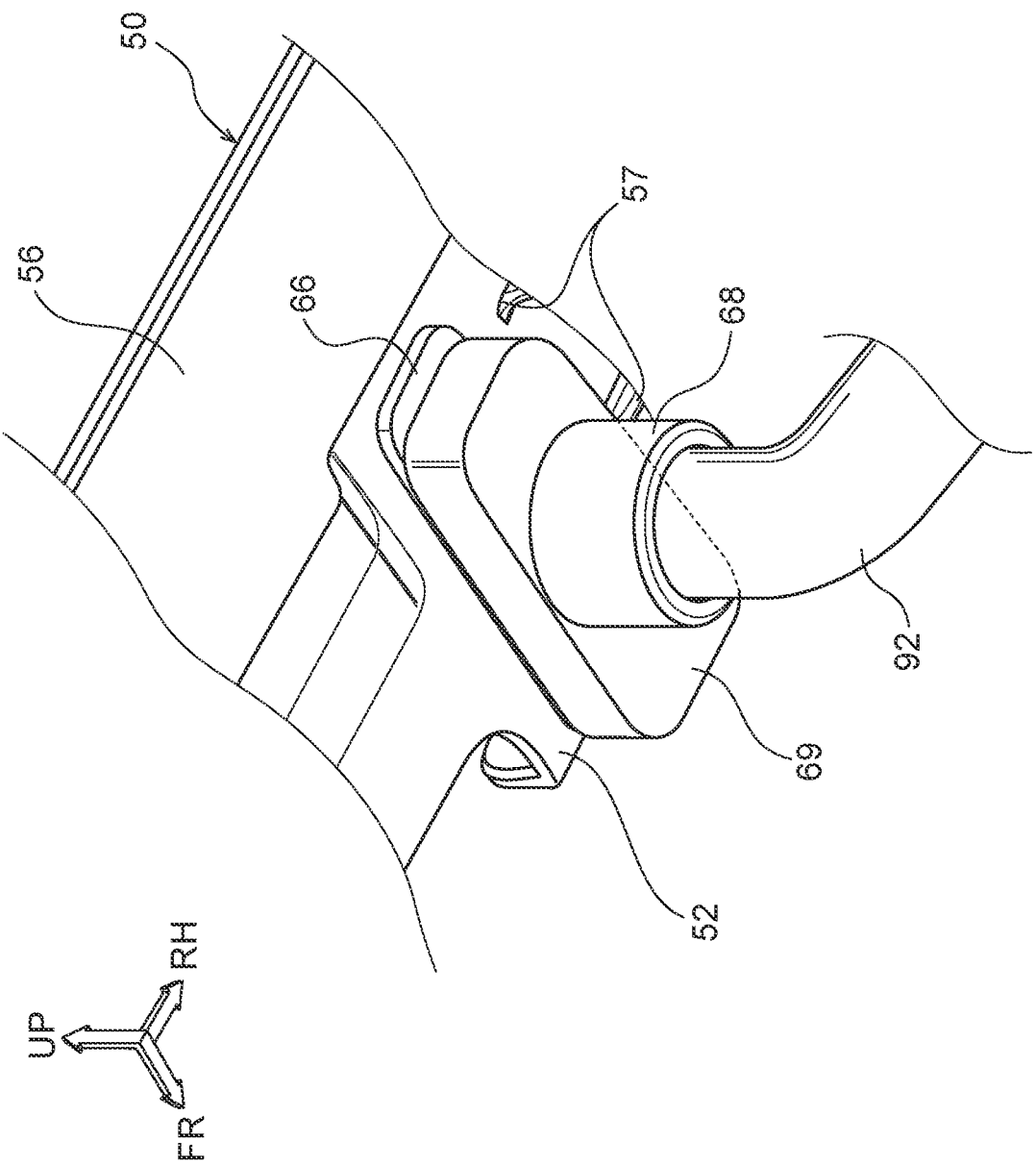
FIG. 10 is a perspective view showing a state in which the electronic inner mirror is attached to the housing configuring the sensor mounting structure pertaining to the embodiment.

A groove portion 67A along the vehicle front and rear direction is formed at least in the side surfaces of the mating receiving portion 67 that face outward in the vehicle width direction, and as shown in FIG. 9 and FIG. 10, a mating portion 69 (see also FIG. 3) that is formed on the upper end portion of the ball joint portion 68 and extends along the vehicle front and rear direction slides from the vehicle rear side and mates with the groove portion 67A.

Because of this, the ball joint portion 68 (the electronic inner mirror 90) is attached to the mirror bracket 66. It will be noted that, as shown in FIG. 2, a spherical upper end portion 92A of an arm member 92, a lower end portion 92B of which is attached to the longitudinal direction central portion of the non-mirror side of the electronic inner mirror 90, is fitted into the ball joint portion 68, and the electronic inner mirror 90 is supported on the housing 50 via the ball joint portion 68.

Furthermore, as shown in FIG. 2 to FIG. 5, the sensor unit 20 is equipped with the stereo camera device 60. The stereo camera device 60 has a right and left pair of stereo cameras 62 serving as a right and left pair of sensors that detect peripheral information (information such as the positions, directions, and distances of objects existing at least in front) of the vehicle 12 different from the peripheral information detected by the locator/telephoto camera device 30, and the stereo camera device 60 is disposed more in the vehicle forward direction than the housing 50.

That is, as described above, the front end portion of the stereo camera device 60 is fastened and supported by the weld bolt 97 and the nut 98 to the secondary base member 24, and both right and left sides of the rear end portion of the stereo camera device 60 are fastened and supported by the weld bolts 97 and the nuts (not shown in the drawings) to the base member 22.

Additionally, as shown in FIG. 2, the front portion of the hood member 46 overlaps the rear end portion of the stereo camera device 60 in the vehicle front and rear direction as seen in a side view. In other words, the front portion of the hood member 46 covers, from the vehicle upper side, the vehicle width direction substantially central portion of the rear end portion of the stereo camera device 60.

Because of this, the front wall 54 of the housing 50 is disposed in close proximity to a rear wall 60B (see FIG. 2) of a device body 60A of the stereo camera device 60. It will be noted that angle-of-view hood portions 64 each formed in the shape of an isosceles trapezoid that widens in the vehicle width direction heading in the vehicle forward direction as seen in a plan view are integrally formed on the vehicle front sides of the stereo cameras 62 in the device body 60A of the stereo camera device 60.

Furthermore, as shown in FIG. 1, FIG. 2, FIG. 4, and FIG. 5, the stereo camera device 60 and the front-side portion of the housing 50 are covered from the vehicle lower side by a primary cover 70. The primary cover 70 is formed of a resin material such as polycarbonate (PC) and has a bottom wall 72 in the shape of a rectangular flat plate, a front wall 74 that is curved in the shape of a cross-sectionally circular arc having a vehicle lower side that becomes convex so as to extend in the vehicle upward direction from the front end portion of the bottom wall 72, and right and left side walls 76 that have a height capable of housing the stereo camera device 60 and the front-side portion of the housing 50.

A right and left pair of engagement claws 78 that extend in the vehicle rearward direction are provided in the vehicle front and rear direction substantially central portion of the bottom wall 72 and on the right and left side wall 76 sides, and the engagement claws 78 are inserted from the vehicle front side into and become engaged with the engagement receiving portions 26 formed in the base member 22. Furthermore, a right and left pair of engagement claws 79 that extend in the vehicle rearward direction are provided on the inner surface on the vehicle width direction central side of the front wall 74, and the engagement claws 79 are inserted from the vehicle front side into and become engaged with the engagement receiving holes 28 formed in the secondary base member 24.

Namely, the primary cover 70 is attached to the base member 22 and the secondary base member 24 as a result of the engagement claws 78 and the engagement claws 79 being inserted into and becoming engaged with the engagement receiving portions 26 and the engagement receiving holes 28. Additionally, as indicated by the long-dashed short-dashed line in FIG. 2, a lower end portion (the boundary portion between the bottom wall 72 and the front wall 74) 73 of the primary cover 70 does not project in the vehicle downward direction beyond a line of sight Y of the occupant (driver) that passes along a lower edge portion 90B of the electronic inner mirror 90 (a field of view is ensured).

Furthermore, as shown in FIG. 1 and FIG. 2, an overhead console 16 equipped with a cabin lamp (not shown in the drawings) and so forth is disposed on the vehicle rear side of the housing 50 (the sensor unit 20) and on the vehicle lower side of a roof header 18. Additionally, a secondary cover 80 serving as a cover member that covers a gap between the primary cover 70 and the overhead console 16 (the remaining rear-side portion of the housing 50) is provided on the vehicle rear side of the primary cover 70 and on the vehicle front side of the overhead console 16.

Figure 11:
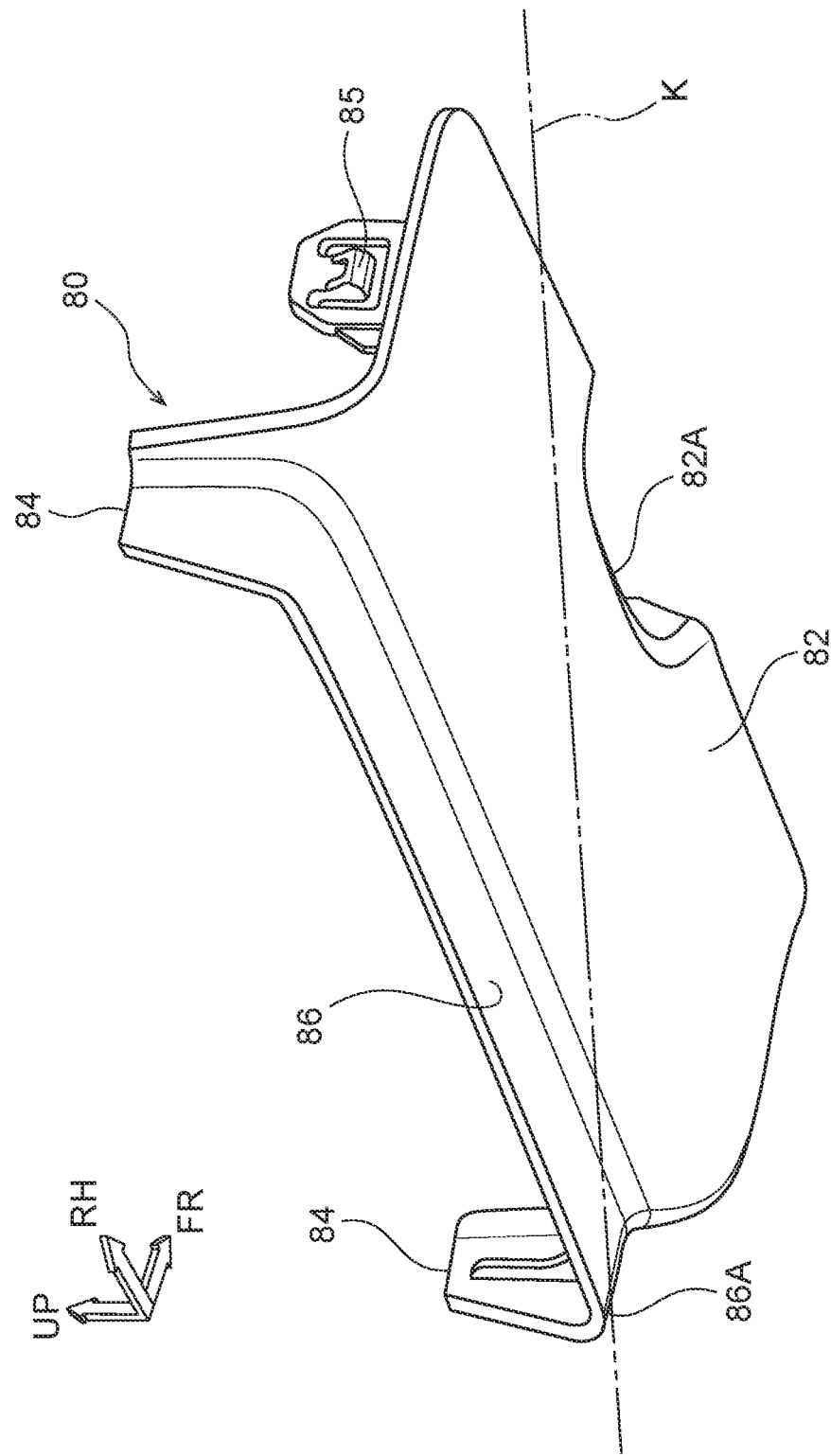
FIG. 11 is a perspective view showing a secondary cover configuring the sensor mounting structure pertaining to the embodiment as seen from below.
Figure 12:
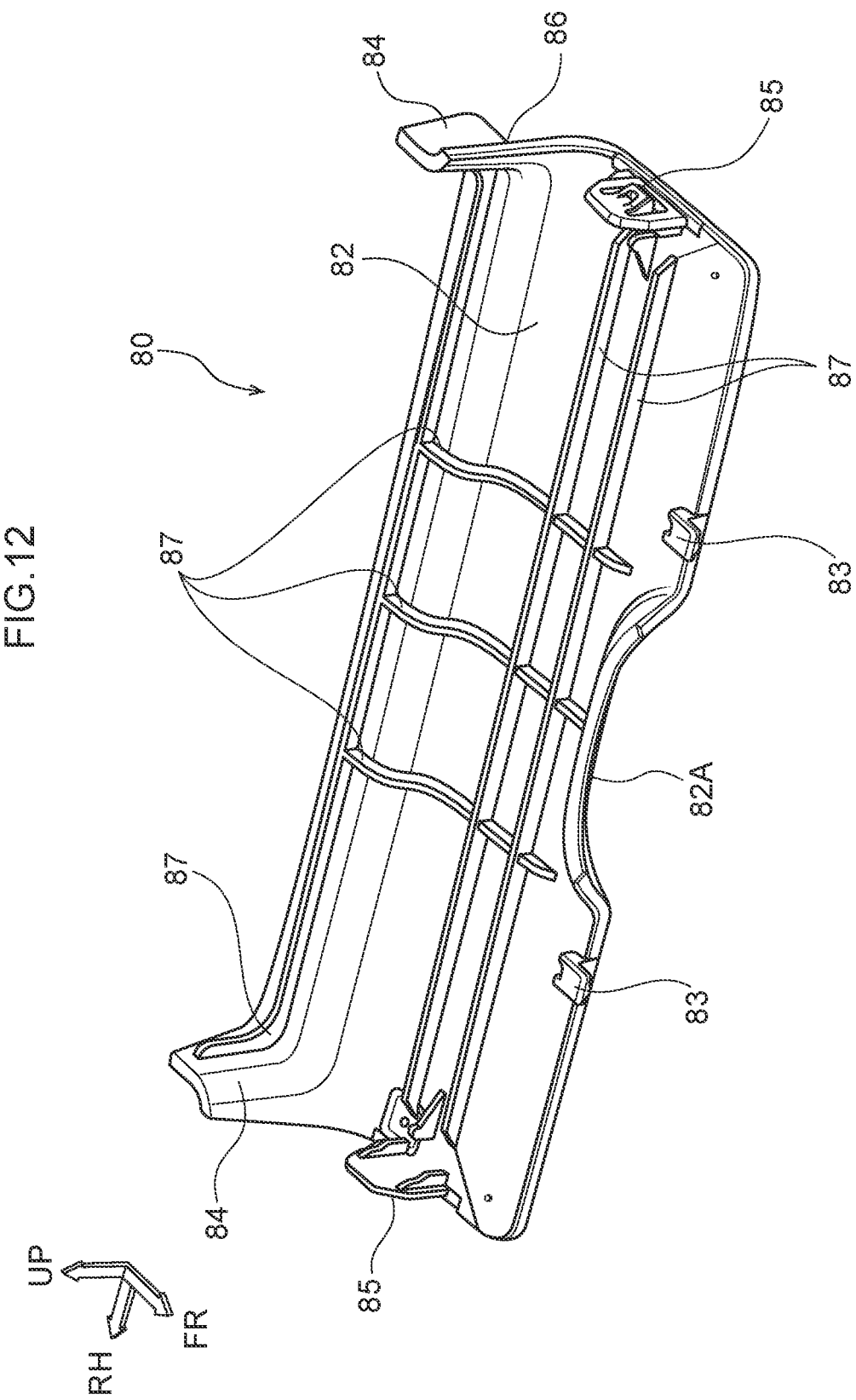
FIG. 12 is a perspective view showing the secondary cover configuring the sensor mounting structure pertaining to the embodiment as seen from above.

As shown in FIG. 11 and FIG. 12, the secondary cover 80 is formed of a resin material such as polycarbonate (PC) and has a bottom wall 82 substantially in the shape of a flat plate and right and left side walls 84 that extend integrally in the vehicle upward direction from both right and left end portions of the rear end portion of the bottom wall 82. The rear end portion of the bottom wall 82 is bent in a cross-sectionally substantially L-shape that becomes convex in the vehicle upward direction ranging across the entire vehicle width direction as seen in a side view, and the right and left side walls 84 are bent in cross-sectionally substantially L-shapes that become convex inward in the vehicle width direction as seen in a plan view.

Figure 13:
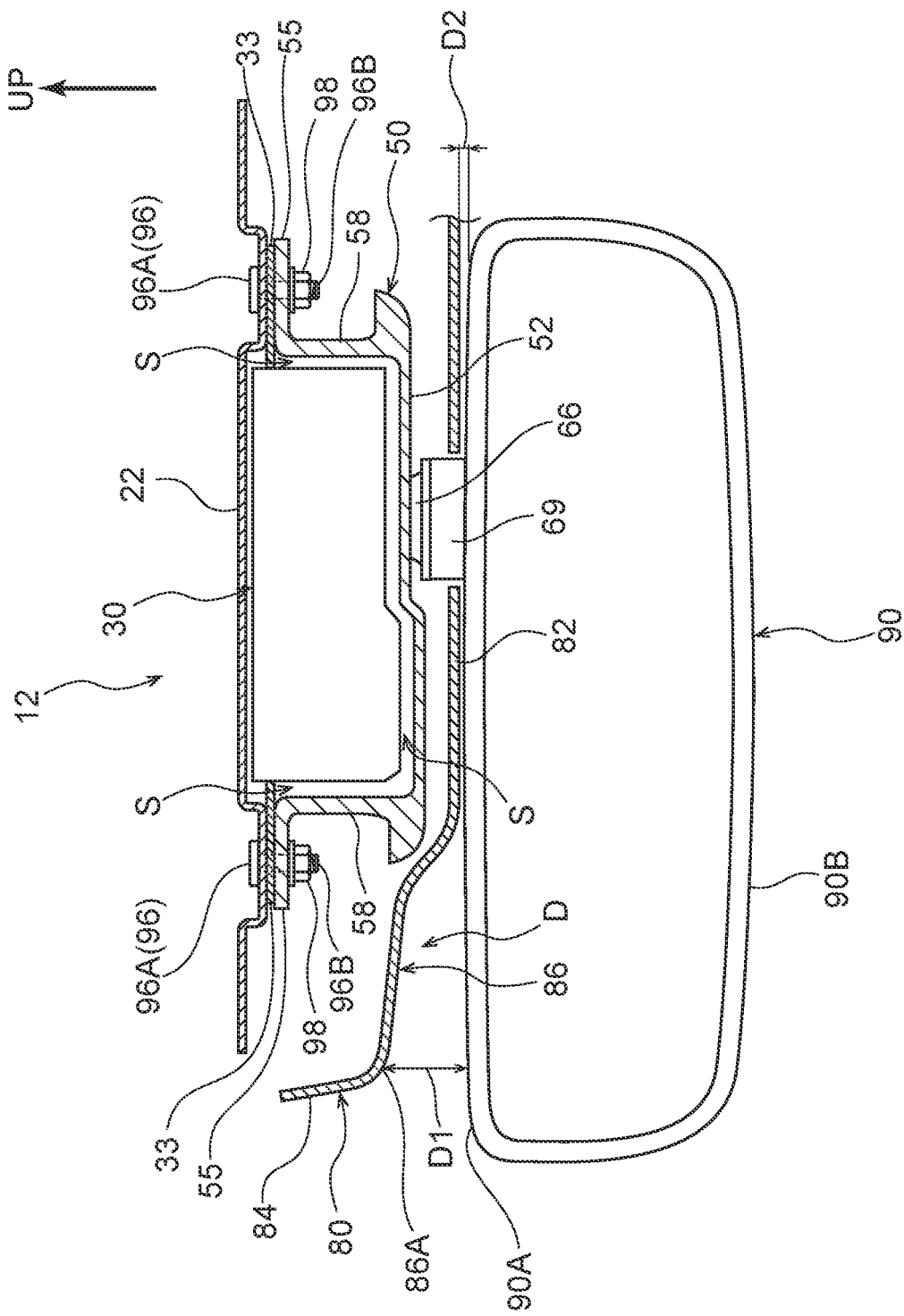
FIG. 13 is a general back view showing the secondary cover and the electronic inner mirror configuring the sensor mounting structure pertaining to the embodiment as seen when cut along imaginary line K in FIG. 11.

Namely, a stepped portion 86 that is continuous with the right and left side walls 84 (is disposed in a higher position than the bottom wall 82) is formed in the rear end portion of the bottom wall 82. Because of this stepped portion 86, as shown in FIG. 13, when an upper edge portion 90A and the lower edge portion 90B at the end portion on the left side of the electronic inner mirror 90 are gripped and moved by the fingers (of the left hand) of the occupant, it becomes easier for the fingers to enter a space D between the upper edge portion 90A of the electronic inner mirror 90 and the rear end portion of the bottom wall 82 of the secondary cover 80.

Specifically, for example, in the case of the right-hand-drive vehicle 12, ordinarily the occupant (driver) tilts the electronic inner mirror 90 such that, as seen in a plan view, the right-side end portion (one longitudinal direction end portion) of the electronic inner mirror 90 is disposed on the vehicle front side of the lower end portion 92B of the arm member 92 and the left-side end portion (the other longitudinal direction end portion) is disposed on the vehicle rear side of the lower end portion 92B of the arm member 92. That state is shown in FIG. 1 and FIG. 13.

Consequently, a shortest distance D1 between the upper edge portion 90A at the left-side end portion of the electronic inner mirror 90 and a left-side rear end portion 86A of the stepped portion 86 of the secondary cover 80 that opposes the upper edge portion 90A in the vertical direction is longer than a shortest distance D2 between the upper edge portion 90A at the central portion (longitudinal direction central portion) and right-side end portion of the electronic inner mirror 90 and the bottom wall 82 of the secondary cover 80 that opposes the upper edge portion 90A in the vertical direction. Because of this, the space D into which the fingers (of the left hand) of the driver can be inserted is formed between the upper edge portion 90A at the left-side end portion of the electronic inner mirror 90 and the left-side rear end portion 86A of the stepped portion 86 of the secondary cover 80.

Furthermore, a right and left pair of engagement claws 83 (see FIG. 12) that project in the vehicle forward direction are provided on the front end portion of the bottom wall 82 of the secondary cover 80, and the engagement claws 83 become engaged with the rear end portion of the primary cover 70. Additionally, a right and left pair of engagement claws 85 that project in the vehicle upward direction are provided on both right and left end portions (in front of the side walls 84) of the bottom wall 82 of the secondary cover 80, and the engagement claws 85 are inserted into and become engaged with engagement receiving holes (not shown in the drawings) serving as engagement receiving portions formed in the primary cover 70.

Consequently, the secondary cover 80 is attached between the primary cover 70 and the overhead console 16 by first causing the engagement claws 83 on the front end portion of the bottom wall 82 to engage with the rear end portion of the primary cover 70 and then inserting and causing the engagement claws 85 on both right and left end portions of the bottom wall 82 to engage with the engagement receiving holes in the primary cover 70. It will be noted that plural reinforcement ribs 87 that extend in the front and rear direction and the right and left direction are integrally formed in appropriate positions on the upper surface (non-design surface) of the secondary cover 80.

Furthermore, a cutout portion 82A cut out substantially in the shape of a semicircular arc heading in the vehicle rearward direction as seen in a bottom view is formed in the vehicle width direction central portion of the front end portion of the bottom wall 82 of the secondary cover 80 (between the engagement claws 83 provided on the front end portion of the bottom wall 82). Additionally, a cutout portion (not shown in the drawings) cut out substantially in the shape of a semicircular arc heading in the vehicle forward direction as seen in a bottom view is formed in the vehicle width direction substantially central portion of the rear end portion of the bottom wall 72 of the primary cover 70.

The ball joint portion 68 (the arm member 92) is exposed through an open portion formed by the cutout portion of the primary cover 70 and the cutout portion 82A of the secondary cover 80. It will be noted that a cover portion 88 (see FIG. 1) that is substantially U-shaped as seen in a bottom view and projects in the vehicle downward direction may also be provided on the peripheral edge portion of the cutout portion 82A of the secondary cover 80. In this case, the ball joint portion 68 (the arm member 92) can be hidden by the cover portion 88 from the line of sight of the occupant (driver).

Next, the action of the sensor mounting structure 10 (the sensor unit 20) pertaining to the embodiment having the above configuration will be described.

The longitudinal direction central portion of the non-mirror side of the electronic inner mirror 90 is attached, such that its angle is adjustable, to the lower end portion 92B of the arm member 92. Additionally, the upper end portion 92A of the arm member 92 is attached via the ball joint portion 68 and the mating portion 69 to the bottom wall 52 of the housing 50 (the mirror bracket 66).

Here, the housing 50 that houses (covers) part (the lower portion including the electronic substrate 40) of the locator/telephoto camera device 30 is formed in the shape of a casing having a vehicle upper side that is open. Consequently, support rigidity for the housing 50 to support the electronic inner mirror 90 is ensured. Furthermore, the housing 50 is fastened to the base member 22 together with the device body 30A of the locator/telephoto camera device 30.

That is, the housing 50 in the shape of a casing is provided between the upper end portion 92A of the arm member 92 and the base member 22. Consequently, compared to a case where, for example, the position of the electronic inner mirror 90 is the same and the upper end portion 92A of the arm member 92 is directly attached to the base member 22, the length of the arm member 92 can be reduced. Thus, vibration of the electronic inner mirror 90 during travel can be inhibited.

Furthermore, the mirror bracket 66 to which the upper end portion 92A of the arm member 92 is attached is formed substantially in the shape of a rectangular flat plate having a longitudinal direction that coincides with the vehicle front and rear direction (long in the vehicle front and rear direction and short in the vehicle width direction). Consequently, the rigidity, in the vehicle front and rear direction, of the bottom wall 52 including the mirror bracket 66 is improved, and vibration, along the vehicle front and rear direction, of the electronic inner mirror 90 during travel can be effectively inhibited.

Furthermore, for example, in the right-hand-drive vehicle 12, as shown in FIG. 13, the shortest distance D1 between the upper edge portion 90A at the left-side end portion of the electronic inner mirror 90 and the left-side rear end portion 86A of the stepped portion 86 of the secondary cover 80 is longer than the shortest distance D2 between the upper edge portion 90A at the central portion and right-side end portion of the electronic inner mirror 90 and the bottom wall 82 of the secondary cover 80 (the space D widens in the vertical direction because of the stepped portion 86).

Consequently, the space D for the occupant to insert his/her fingers (of the left hand) to the upper side of the upper edge portion 90A at the left-side end portion of the electronic inner mirror 90 is excellently ensured. Namely, even in a configuration in which the electronic inner mirror 90 is attached, such that vibration is inhibited, to the sensor unit 20 provided on the inner surface of the front windshield glass 14, the angle of the electronic inner mirror 90 can be easily adjusted with the fingers (of the left hand) of the occupant.

Furthermore, the secondary cover 80 covers the housing 50 from the vehicle lower side in avoidance of the arm member 92. Consequently, compared to a case where the secondary cover 80 covers the housing 50 from the vehicle lower side including also the arm member 92, that is, a case where the cover portion 88 is formed integrally with the secondary cover 80, the shape of the secondary cover 80 can be simplified.

Furthermore, as described above, the lower portion of the locator/telephoto camera device 30 including the electronic substrate 40 is housed in the housing 50. Consequently, the electronic substrate 40 is effectively protected and the space for installing the locator/telephoto camera device 30 can be reduced.

Furthermore, as described above, the device body 30A of the locator/telephoto camera device 30 is fastened to the base member 22 together with the housing 50. Consequently, compared to a case where the device body 30A is fastened to the base member 22 separately from the housing 50, the number of weld bolts 96 (the number of parts) can be reduced. In particular, the device body 30A of the locator/telephoto camera device 30 and the housing 50 are fastened to the base member 22 at four points spaced apart from each other in the vehicle front and rear direction and the vehicle width direction, so compared to a case where, for example, they are fastened at three points, the electronic inner mirror 90, which is a weighty object heavier than an ordinary optical mirror (not shown in the drawings), can be supported in a state in which it is made stable with respect to vibration in the vehicle front and rear direction and the vehicle width direction.

Furthermore, the space (gap) S is formed between the outer surface of the locator/telephoto camera device 30 (the device body 30A and the electronic substrate 40) housed inside the housing 50 and the inner surface of the housing 50 (the inner surface of the housing 50 is disposed away from the outer surface of the locator/telephoto camera device 30 housed inside the housing 50). Here, loads are not transmitted where the space S is formed.

Consequently, compared to a case where the space S is not formed between the outer surface of the locator/telephoto camera device 30 housed inside the housing 50 and the inner surface of the housing 50, the load that acts on the housing 50 when the occupant (driver) moves the electronic inner mirror 90 can be inhibited or prevented from acting via the arm member 92 on the locator/telephoto camera device 30. Thus, fluctuation in the positions of the locator camera 42 and the telephoto camera 44 (shifting of their optical axes) can be inhibited or prevented.

In particular, the upper end portion 92A of the arm member 92, to lower end portion 92B of which the electronic inner mirror 90 is attached such that its angle is adjustable, is attached to the bottom wall 52 of the housing 50, so when the space S is formed at least between the bottom surface of the locator/telephoto camera device 30 (the lower surface of the electronic substrate 40) and the inner surface of the bottom wall 52, fluctuation in the positions of the locator camera 42 and the telephoto camera 44 (shifting of their optical axes) can be more effectively inhibited or prevented.

Furthermore, the cutout portion 59 (open portion) that allows the connector 39 provided on the electronic substrate 40 to project therethrough is formed in the right-side side wall 58R and flange portion 55R of the housing 50 and between the through holes 55A spaced apart from each other in the vehicle front and rear direction.

Consequently, compared to a case where the housing 50 does not have the cutout portion 59 that allows the connector 39 to project therethrough, the routing of the wiring H can be simplified. Furthermore, it becomes unnecessary to extend, for example, part of the electronic substrate 40 to the outside of the housing 50 in order to attach the connector 39, so the electronic substrate 40 can resultantly be reduced in size.

Furthermore, the front and rear pair of ribs 57 for reinforcing the right-side flange portions 55R divided by the cutout portion 59 are integrally formed ranging from the lower surface of the peripheral edge portion of the cutout portion 59 formed in the right-side flange portion 55R to the outer surface of the right-side side wall 58R and the outer surface of the bottom wall 52. Consequently, even when the cutout portion 59 is formed, a reduction in the rigidity of the housing 50 can be inhibited.

Moreover, the locator/telephoto camera device 30 is configured by the locator camera 42 and the telephoto camera 44 that have different focal lengths. That is, the front and rear direction length of the telephoto camera 44 is formed longer than that of the locator camera 42. Additionally, the telephoto camera 44 is disposed in a lower position than the locator camera 42.

Consequently, even when the lengths of the locator camera 42 and the telephoto camera 44 are different, both the locator camera 42 and the telephoto camera 44 can be disposed in close proximity to the inner surface of the front windshield glass 14, and a reduction in detection performance with respect to the peripheral information of the vehicle 12 can be inhibited or prevented (detection performance can be improved).

Furthermore, the locator camera 42 and the telephoto camera 44 are electrically connected to the shared (single) electronic substrate 40. Consequently, compared to a case where, for example, an electronic substrate is provided for each camera, the number of parts in the sensor unit 20 can be reduced and the manufacturing cost of the sensor unit 20 can be reduced.

Furthermore, the hood member 46 (colored black) is provided on the protruding portion 38 (the device body 30A) on the vehicle front and lower side of the locator camera 42 and the telephoto camera 44. Consequently, compared to a case where the hood member 46 is not provided on the protruding portion 38 (the device body 30A) on the vehicle front and lower side of the locator camera 42 and the telephoto camera 44, the reflection of light that has passed through the front windshield glass 14 (reflection into the locator camera 42 and the telephoto camera 44) can be inhibited or prevented, and a reduction in detection performance with respect to the peripheral information of the vehicle 12 can be further inhibited or prevented.

Furthermore, the heaters 48 are provided via the heat-insulating sheets on the lower surface of the hood member 46. Consequently, antifogging performance with respect to the front windshield glass 14 is ensured. It will be noted that when the hood member 46 is formed of a metal such as aluminum alloy integrally with the base member 22, the heat from the heaters 48 can be efficiently transmitted from the hood member 46 to the base member 22, so the antifogging performance with respect to the front windshield glass 14 can be improved.

Moreover, when the hood member 46 is formed integrally with the base member 22, compared to a case where the hood member 46 is provided separately on the protruding portion 38 (the device body 30A), the number of parts for configuring the locator/telephoto camera device 30 can be reduced, and the manufacturing cost thereof can be reduced.

Furthermore, the stereo camera device 60 is disposed more in the vehicle forward direction than the locator/telephoto camera device 30, and the front end portion of the hood member 46 overlaps the vehicle upper side of the rear end portion of the stereo camera device 60 in the vehicle front and rear direction. Namely, the front wall 54 of the housing 50 is disposed in close proximity to the rear wall 60B of the device body 60A of the stereo camera device 60.

Consequently, compared to a case where, for example, the rear wall 60B of the stereo camera device 60 is disposed more in the vehicle forward direction than the front end portion of the hood member 46, the vehicle front and rear direction length from the front end portion of the stereo camera device 60 to the rear end portion of the locator/telephoto camera device 30 can be reduced. Namely, at least the vehicle front and rear direction length of the sensor unit 20 can be reduced in size, and the installation space of the locator/telephoto camera device 30 and the stereo camera device 60 can be reduced.

The sensor mounting structure 10 pertaining to the embodiment has been described above based on the drawings, but the sensor mounting structure 10 pertaining to the embodiment is not limited to what is shown in the drawings and can undergo appropriate design changes in a range that does not depart from the present disclosure. For example, the display device is not limited to the electronic inner mirror 90 and may also be an ordinary optical mirror. It will be noted that, in the embodiment, that which is reflected in an ordinary optical mirror is also considered an "image."

Furthermore, it suffices for the space S to be formed between one or plural surfaces selected from among the outer surfaces—that is, the bottom surface, the front surface, the rear surface, and the side surfaces—of the locator/telephoto camera device 30 and the opposing inner surface(s) of the housing 50 (the bottom wall 52, the front wall 54, the rear wall 56, and the side walls 58). However, because the upper end portion 92A of the arm member 92 is attached to the bottom wall 52 of the housing 50, it is preferred that the space S be formed at least between the bottom surface of the locator/telephoto camera device 30 (the lower surface of the electronic substrate 40) and the inner surface of the bottom wall 52.

Furthermore, the cover member is not limited to the secondary cover 80. In a case where, for example, the primary cover 70 is extended in the vehicle rearward direction and the secondary cover 80 is omitted, the primary cover 70 becomes the cover member, and in a case where, for example, part of the overhead console 16 is extended in the vehicle forward direction and the secondary cover 80 is omitted, that part of the overhead console 16 becomes the cover member.

Furthermore, part (excluding the flange portions 33) of the device body 30A of the locator/telephoto camera device 30 may also be configured to contact the housing 50. In this case, the heat emitted by the locator/telephoto camera device 30 can escape to the housing 50 (the housing 50 can be utilized as a heat dissipating member).

Furthermore, the sensor is not limited to the locator camera 42 and the telephoto camera 44 and may also, for example, be a sensor that uses an infrared laser beam as long as it is a sensor that can detect the peripheral information of the vehicle 12 (as long as it is a sensor by which detection performance with respect to the peripheral information of the vehicle 12 is improved). Moreover, the hood member 46 is not limited to a configuration in which it is colored black, and, for example, black nonwoven fabric (not shown in the drawings) may also be stuck to the upper surface of the hood member 46.

What is claimed is:

1. A sensor mounting structure comprising:
   a sensor device that detects at least information in front of a vehicle;
   a support member that houses part of the sensor device and is attached to a base member provided on an inner surface of a front windshield glass; and
   a display device that displays at least an image of what is in back of the vehicle, the display device being attached such that its angle is adjustable, to a lower end portion of an arm member having upper end portion that is attached to the support member,
   wherein a space is formed between an outer surface of the part of the sensor device housed in the support member and an inner surface of the support member.

2. The sensor mounting structure according to claim 1, wherein
   the support member is formed in a shape of a casing having a bottom wall,
   the upper end portion of the arm member is attached to the bottom wall, and
   the space is formed at least between a bottom surface of the sensor device and an inner surface of the bottom wall.

3. The sensor mounting structure according to claim 2, wherein
   a bracket having longitudinal direction, that coincides with the vehicle front and rear direction, is provided on the bottom wall, and
   the upper end portion of the arm member is attached to the bracket.

4. The sensor mounting structure according to claim 1, wherein the support member is fastened, together with the sensor device, to the base member.

5. The sensor mounting structure according to claim 4, wherein the support member and the sensor device are fastened to the base member at four points spaced apart from each other in the vehicle front and rear direction and the vehicle width direction.

6. The sensor mounting structure according to claim 1, wherein the display device is an electronic inner mirror.

7. The sensor mounting structure according to claim 1, wherein the sensor device is configured to include a camera, or a sensor that uses an infrared laser beam.

8. The sensor mounting structure according to claim 1, further comprising a cover member that covers the support member,
   wherein the shortest distance between an upper edge portion at a longitudinal direction end portion of the display device and the cover member is longer than the shortest distance between the upper edge portion at a longitudinal direction central portion of the display device and the cover member.

9. The sensor mounting structure according to claim 8, wherein the cover member has a stepped portion in a portion thereof that opposes the upper edge portion at the longitudinal direction end portion of the display device.

10. The sensor mounting structure according to claim 8, wherein the cover member covers the support member in avoidance of the arm member.

* * * * *